United States Patent
Thielen et al.

(10) Patent No.: US 11,765,426 B2
(45) Date of Patent: *Sep. 19, 2023

(54) MODIFYING PLAYBACK OF REPLACEMENT CONTENT BASED ON CONTROL MESSAGES

(71) Applicant: Roku, Inc., San Jose, CA (US)

(72) Inventors: Kurt R. Thielen, Maple Grove, MN (US); Peter Dunker, Weimar (DE); Markus K. Cremer, Orinda, CA (US); Steven D. Scherf, Oakland, CA (US); Shashank Merchant, Sunnyvale, CA (US)

(73) Assignee: ROKU, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/649,002

(22) Filed: Jan. 26, 2022

(65) Prior Publication Data

US 2022/0150588 A1    May 12, 2022

Related U.S. Application Data

(63) Continuation of application No. 16/182,201, filed on Nov. 6, 2018, now Pat. No. 11,272,252.

(Continued)

(51) Int. Cl.
*H04N 21/44* (2011.01)
*H04N 21/431* (2011.01)
(Continued)

(52) U.S. Cl.
CPC .  *H04N 21/44016* (2013.01); *H04N 21/23424* (2013.01); *H04N 21/26241* (2013.01);
(Continued)

(58) Field of Classification Search
CPC ......... H04N 21/4622; H04N 21/23424; H04N 21/26241; H04N 21/4316; H04N 21/4325;
(Continued)

(56) References Cited

U.S. PATENT DOCUMENTS 7,861,017 B2  12/2010  Agnihotri et al.
9,326,038 B2   4/2016  Lundholm
(Continued)

FOREIGN PATENT DOCUMENTS

CN  101827093 A  9/2018
CN  112514409 A  3/2021
(Continued)

OTHER PUBLICATIONS

Final Office Action received for U.S. Appl. No. 16/182,201, dated Sep. 28, 2020, 17 pages.

(Continued)

*Primary Examiner* — Jefferey F Harold
*Assistant Examiner* — Alexander Boyd
(74) *Attorney, Agent, or Firm* — Sterne, Kessler, Goldstein & Fox P.L.L.C.

(57) ABSTRACT

In one aspect, an example method includes (i) identifying, by a playback device, a media device based on a control message received from the media device by way of an audio and/or video interface, where the media device provides media content to the playback device; (ii) providing, by the playback device, replacement media content for display; (iii) determining, by the playback device, that while the playback device is displaying the replacement media content a remote control transmitted an instruction to the identified media device; (iv) determining, by the playback device, a playback-modification action corresponding to the instruction and the identified media device; and (v) modifying, by the (Continued)

playback device, playback of the replacement media content in accordance with the playback-modification action.

20 Claims, 10 Drawing Sheets

Related U.S. Application Data

(60) Provisional application No. 62/700,410, filed on Jul. 19, 2018.

(51) Int. Cl.
| | |
|---|---|
| *H04N 21/234* | (2011.01) |
| *H04N 21/488* | (2011.01) |
| *H04N 21/4415* | (2011.01) |
| *H04N 21/262* | (2011.01) |
| *H04N 21/432* | (2011.01) |
| *H04N 21/442* | (2011.01) |
| *H04N 21/462* | (2011.01) |

(52) U.S. Cl.
CPC ..... *H04N 21/4316* (2013.01); *H04N 21/4325* (2013.01); *H04N 21/4415* (2013.01); *H04N 21/44231* (2013.01); *H04N 21/4622* (2013.01); *H04N 21/4882* (2013.01)

(58) Field of Classification Search
CPC ......... H04N 21/44016; H04N 21/4415; H04N 21/44231; H04N 21/4882
See application file for complete search history.

(56) References Cited

U.S. PATENT DOCUMENTS

| | | | | |
|---|---|---|---|---|
| 9,640,067 | B1* | 5/2017 | Scalise | G08C 19/00 |
| 11,272,252 | B2 | 3/2022 | Thielen et al. | |
| 2010/0195001 | A1* | 8/2010 | Doyle | H04N 21/47 |
| | | | | 348/734 |
| 2010/0199308 | A1 | 8/2010 | Hall et al. | |
| 2011/0019978 | A1 | 1/2011 | Jagmag | |
| 2014/0196085 | A1 | 7/2014 | Dunker et al. | |
| 2016/0234564 | A1 | 8/2016 | Holyoak | |
| 2017/0094351 | A1 | 3/2017 | Gordon | |
| 2017/0099506 | A1 | 4/2017 | Grover | |
| 2017/0150213 | A1 | 5/2017 | Cremer et al. | |
| 2017/0188088 | A1 | 6/2017 | Hammer et al. | |
| 2017/0188115 | A1 | 6/2017 | Bafekr | |
| 2017/0272814 | A1 | 9/2017 | Chen | |
| 2017/0366778 | A1 | 12/2017 | Kim et al. | |
| 2018/0131891 | A1 | 5/2018 | Satheesh et al. | |
| 2018/0234728 | A1 | 8/2018 | Hwang et al. | |
| 2019/0020543 | A1* | 1/2019 | Asnis | H04B 10/1143 |
| 2020/0029118 | A1 | 1/2020 | Thielen et al. | |
| 2021/0014078 | A1* | 1/2021 | Thompson | H04N 21/43615 |

FOREIGN PATENT DOCUMENTS

| | | |
|---|---|---|
| EP | 3824648 A1 | 5/2021 |
| JP | 2014-520480 A | 8/2014 |
| TW | 201031208 A | 8/2010 |
| TW | 201418971 A | 5/2014 |
| TW | 202008795 A | 2/2020 |
| WO | 2017/106695 A2 | 6/2017 |

OTHER PUBLICATIONS

Advisory Action received for U.S. Appl. No. 16/182,201, dated Nov. 12, 2020, 3 pages.
Non-Final Office Action received for U.S. Appl. No. 16/182,201, dated Apr. 13, 2021, 16 pages.
Translated Office Action for related Japanese Patent Application No. 2021-503046, dated Mar. 9, 2022.
International Search Report received for PCT Patent Application No. PCT/US2019/040553, dated Oct. 25, 2019, 3 pages.
Written Opinion received for PCT Patent Application No. PCT/US2019/040553, dated Oct. 25, 2019, 6 pages.
Hdmi Licensing et al: "Supplement 1 Consumer Electronics Control (CEC)", Mar. 17, 2013 (Mar. 17, 2013), XP055134477, Retrieved from the Internet: URL:https://web.archive.org/web/20130317190902/http://xtreamerdev.googlecode.com/files/CEC_Specs.pdf [retrieved on Aug. 12, 2014].
Search Report, dated May 16, 2022, for related Chinese Patent Appl. No. 2019800475548, 5 pages including translation.

* cited by examiner

MODIFYING PLAYBACK OF REPLACEMENT CONTENT BASED ON CONTROL MESSAGES

CROSS-REFERENCE TO RELATED APPLICATIONS

This disclosure is a continuation of U.S. patent application Ser. No. 16/182,201, filed on Nov. 6, 2018, which claims priority to U.S. Provisional Patent App. No. 62/700,410, filed on Jul. 19, 2018, which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In coming years, the replacement of advertisements in media content with targeted advertisements is expected to become an increasingly important advertising method. By way of example, in a dynamic advertisement insertion (DAI) system, a content provider can insert generic advertisements into advertisement-breaks that interrupt sequences of media content, such as live or pre-recorded content. Each advertisement-break can include a set of advertisements arranged in a predetermined order. Further, a particular one of the advertisements can be designated or dynamically selected to be replaced with replacement media content, such as a targeted advertisement.

With this arrangement, prior to displaying the particular advertisement, the playback device can obtain the replacement media content, and then provide the replacement media content for display instead of the particular advertisement. For instance, responsive to determining that the playback device is playing or about to play content immediately preceding the particular advertisement to be replaced, the playback device can retrieve a targeted advertisement from a database, and then provide the targeted advertisement for display in place of the particular advertisement at the appropriate time.

SUMMARY

In one aspect, an example method is disclosed. The method includes (i) identifying, by a playback device, a media device based on a control message received from the media device by way of an audio and/or video interface, where the media device provides media content to the playback device; (ii) providing, by the playback device, replacement media content for display; (iii) determining, by the playback device, that while the playback device is displaying the replacement media content a remote control transmitted an instruction to the identified media device; (iv) determining, by the playback device, a playback-modification action corresponding to the instruction and the identified media device; and (v) modifying, by the playback device, playback of the replacement media content in accordance with the playback-modification action.

In another aspect, an example non-transitory computer-readable medium is disclosed. The computer-readable medium has stored thereon program instructions that upon execution by a processor, cause performance of a set of acts including (i) identifying a media device based on a control message received from the media device by way of an audio and/or video interface, where the media device provides media content to the playback device; (ii) providing replacement media content for display; (iii) determining that while the playback device is displaying the replacement media content a remote control transmitted an instruction to the identified media device; (iv) determining a playback-modification action corresponding to the instruction and the identified media device; and (v) modifying playback of the replacement media content in accordance with the playback-modification action.

In another aspect, an example computing system is disclosed. The computing system is configured for performing a set of acts including (i) identifying a media device based on a control message received from the media device by way of an audio and/or video interface, where the media device provides media content to the playback device; (ii) providing replacement media content for display; (iii) determining that while the playback device is displaying the replacement media content a remote control transmitted an instruction to the identified media device; (iv) determining a playback-modification action corresponding to the instruction and the identified media device; and (v) modifying playback of the replacement media content in accordance with the playback-modification action.

DETAILED DESCRIPTION

I. Overview

In some media systems, a device provides media content to a playback device, and then the playback device provides the media content for display. By way of example, the device can be a media device, such as a set-top box, optical disc player, streaming media player, video gaming system, etc., and the playback device can be a television.

In media systems where a device provides media content to a playback device, a viewer of the playback device can use a remote control to modify operation of the device providing media content to the playback device. For instance, a user can use a remote control to change a channel, access a menu (e.g., an electronic program guide), access a widget, or change a playback speed of media content.

When a viewer controls a media device using a remote control, the media device can insert an overlay into the media content provided to the playback device. This overlay can provide feedback to the user and/or display various information. The overlay could take the form of a graphic that overlays media content that is provided to the playback device for display.

In some DAI systems, when a playback device is displaying replacement media content and a viewer uses a remote control to control a media device, the playback device might not be able to respond accordingly. For instance, if the playback device provides replacement media content for display using a media player that is configured to play media files, the playback device might not be able to perform a channel-change operation or display an overlay. This can lead to a poor or frustrating user-experience for the viewer. For instance, the viewer might not be sure whether the media device received an instruction transmitted by the remote control.

Disclosed herein are methods and systems to address this and potentially other issues. In an example method, a playback device can identify a media device based on a control message received from the media device by way of an audio and/or video interface. Further, the playback device can provide replacement media content for display and determine that, while the playback device is displaying the replacement media content, a remote control transmitted an instruction to the identified media device. Still further, the playback device can determine a playback-modification action corresponding to the instruction and the identified media device, and modify playback of the replacement media content in accordance with the playback-modification action.

II. Example Architecture

A. Computing Device

Figure 1:
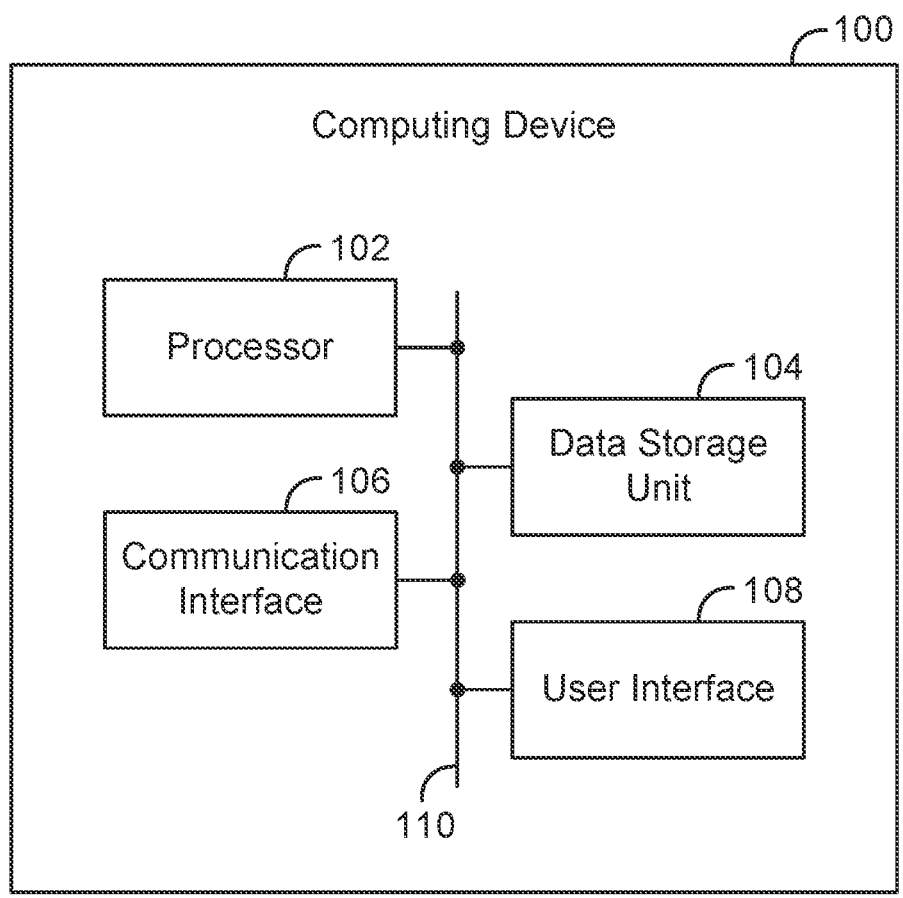
FIG. 1 is a simplified block diagram of an example computing device.

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation terminal, a desktop computer, a laptop, a tablet, a mobile phone, or a television.

B. Dynamic Advertisement Insertion (DAI) System

Figure 2:
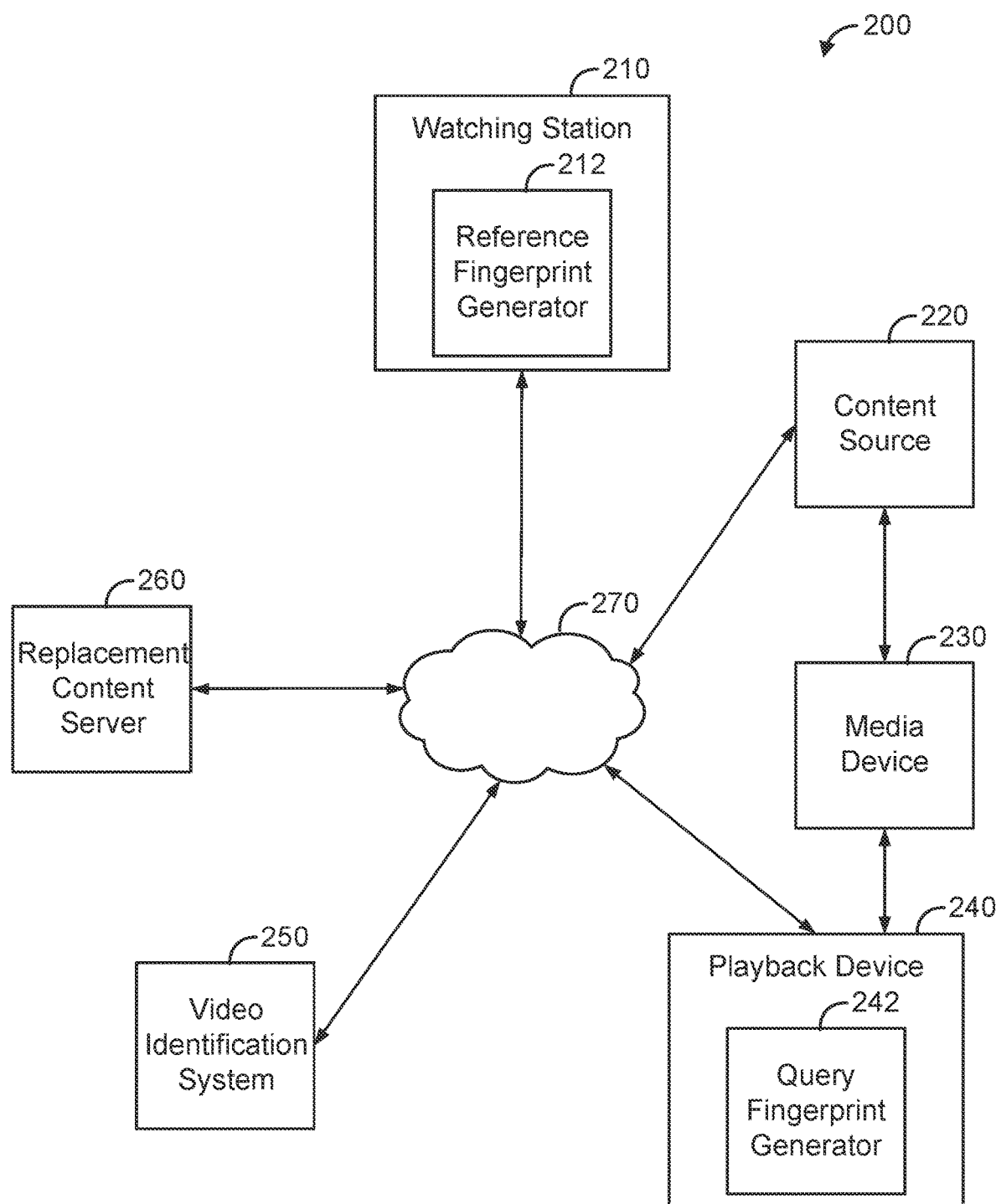
FIG. 2 is a simplified block diagram of an example dynamic advertisement insertion (DAI) system.

FIG. 2 is a simplified block diagram of an example DAI system 200. The DAI system 200 can perform various acts and/or functions related to the delivery and/or presentation of media content (e.g., audio content and/or video content), and can be implemented as a computing system.

DAI system 200 can include various components, such as a watching station 210, a content source 220, a media device 230, a playback device 240, a video identification system 250, and a replacement content server 260, each of which can be implemented as a computing system. Watching station 210 can receive video and other multimedia content from content source 220, such as a broadcaster, web server, or cable television (TV) station. For example, content source 220 may be a broadcaster, such as a TV station or TV network, which streams or transmits media over a TV channel to watching station 210, and/or a web service, such as a website, that streams or transmits media over a network 270 to watching station 210. Watching station 210 includes a reference fingerprint generator 212 that generates reference fingerprints of video content received from content source 220.

Media device 230 can receive the video and other multimedia content from content source 220, such as via a broadcast channel and/or over network 270. Media device 230 can modify the received content before sending content to playback device 240. Media device 230 can include a tuner configured to receive an input stream of video content and generate an output stream of video content by processing the input stream. Media device 230 can be a device equipped with tuners, decoders, and other hardware and/or software such that media device 230 can access video content through a video content distribution network, such as a terrestrial broadcast, cable, and/or satellite broadcast network employed by multichannel video programming distributers. Additionally or alternatively, media device 230 can be a device equipped with network adapters, decoders, and other hardware and/or software such that media device 230 can access video content through a wide area network (e.g., the internet) employed by devices for accessing internet video streaming services. Media device 230 can output signals (e.g., digital or analog signals) usable by a display of playback device 240 to present video content to a user.

Playback device 240 is any device capable of receiving and presenting a stream of video and/or other multimedia content (e.g., a TV, a laptop or other personal computer (PC), a tablet or other mobile device, or a gaming device). Playback device 240 includes a display or other user interface configured to display a processed stream of video content. The display may be a flat-panel screen, a plasma screen, a light emitting diode (LED) screen, a cathode ray tube (CRT), a liquid crystal display (LCD), or a projector. Playback device 240 can also include an antenna configured to receive video by way of an over-the-air broadcast channel.

Network 270 may be any network that enables communication between devices, such as a wired network and/or a wireless network (e.g., a mobile network). Network 270 can include one or more portions that constitute a private network (e.g., a cable TV network or a satellite TV network) or a public network (e.g., over-the-air broadcast channels or the internet).

Video identification system 250 can communicate with watching station 210 and playback device 240 over network 270. Video identification system may receive a query fingerprint generated from video content by a query fingerprint generator 242 of playback device 240, and query an index of known fingerprints generated by a reference fingerprint generator 212 of watching station 210 in order to identify the video content. The query fingerprint may be a fingerprint of a frame or block of frames within the video content. Video identification system can identify the video content by matching the query fingerprint with one or more reference fingerprints.

Upon identifying the video content, video identification system 250 can return to playback device 240 an identifier for replacement media content (e.g., alternative programming or alternative commercials) associated with the video content. The replacement media content can be stored in replacement content server 260. Using the identifier, playback device 240 can access the replacement media content from replacement content server 260 and then provide the replacement media content for display.

Any of the modules, systems, and/or generators may be located at any of the devices shown in FIG. 2. For example, video identification system 250 can include query fingerprint generator 242. With this arrangement, video identification system can receive frames of video content from playback device 240 and generate the query fingerprints using the frames of video content. As another example, media device 230 and playback device 240 can be integrated together within a single device. Other variations are also possible.

Figure 3:
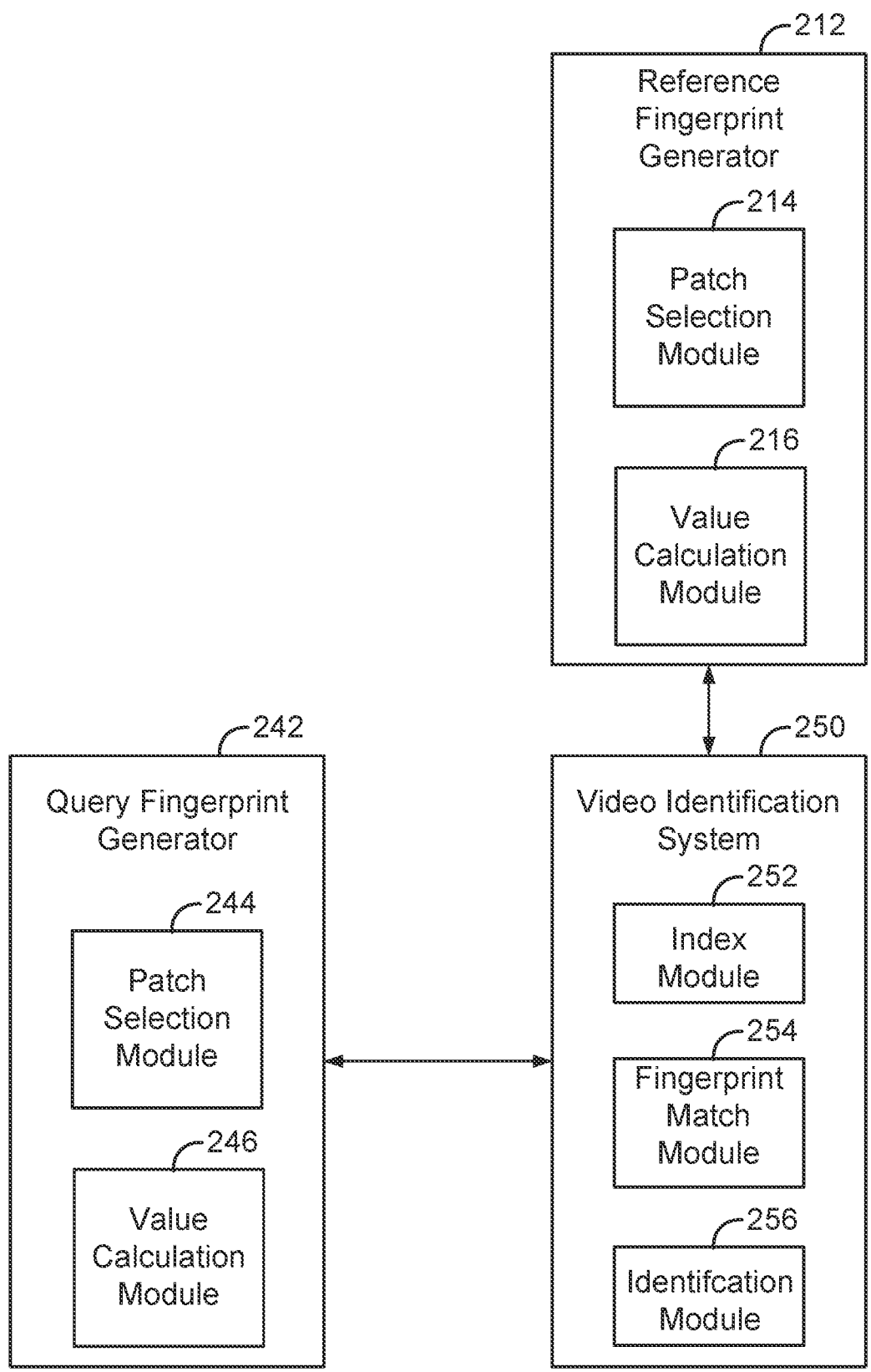
FIG. 3 is a simplified block diagram illustrating components of a reference fingerprint generator, a query fingerprint generator, and a video identification system, according to an example embodiment.

FIG. 3 is a simplified block diagram illustrating components of reference fingerprint generator 212, query fingerprint generator 242, and video identification system 250. As shown in FIG. 3, query fingerprint generator 242 includes a patch selection module 244 and a value calculation module 246, configured to communicate with each other (e.g., via a bus, shared memory, or a switch). Further, video identification system 250 includes an index module 252, a fingerprint match module 254, and an identification module 256, all configured to communicate with each other. Still further, reference fingerprint generator 212 includes a patch selection module 214 and a value calculation module 216, configured to communicate with each other.

One or more of the modules depicted in FIG. 3 can be implemented using hardware (e.g., a processor of a machine, a field-programmable gate array (FPGA), or an application-specific integrated circuit (ASIC), or a combination of hardware and software. Moreover, any two or more of the modules depicted in FIG. 3 can be combined into a single module, and the function described herein for a single module can be subdivided among multiple modules.

In line with the discussion above, query fingerprint generator 242 and reference fingerprint generator 212 can be configured to generate a query fingerprint of one or more frames of video content. For example, query fingerprint generator 242 and reference fingerprint generator 212 can calculate values of patches of one or more frames within the video content. Patches can be located at different locations within a frame. Query fingerprint generator 242 and reference fingerprint generator 212 can be configured to combine query fingerprints from multiple frames to generate a query fingerprint of a block of frames of the video content.

By way of example, patch selection module 244 of query fingerprint generator 242 can be configured to select multiple patches of video content, such as patches associated with one or more regions of a frame or frames within the video content. Similarly, patch selection module 214 of reference fingerprint generator 212 can be configured to select multiple patches of video content, such as patches associated with one or more regions of a frame of frames within the video content.

Patches can be defined by dividing a frame into a grid, such as a 2×2 grid, a 4×3 grid, or a 4×4 grid, and selecting patches based on the grid. For instance, twenty patches may be selected, with four large patches corresponding to quadrants of a frame, and four small patches corresponding to sub-quadrants of each quadrant (i.e. sixteen small patches in total). In some instances, patches may overlap. Further, patches can cumulatively span less than the entirety of a frame.

Value calculation module 246 of query fingerprint generator 242 can be configured to calculate a value for each of the selected multiple patches using, for example, an integral image technique. The integral image technique may calculate the values using a summed area table or other data structure that generates a sum of values of a group of pixels.

Similarly, value calculation module 216 of reference fingerprint generator 212 can be configured to calculate a value for each of the selected multiple matches using, for example, an integral imaging technique.

In some examples, value calculation module 246 and value calculation module 216 can calculate a value for a patch by summing the values of a group of pixels with the patch, averaging the values of a group of pixels, or determining a media value of the group of pixels. Additionally or alternatively, value calculation module 246 and value calculation module 216 can calculate a value for a patch by computing differences between values of a group of pixels or computing a linear combination of values of a group of pixels.

Index module 252 of video identification system 250 can be configured to query a database of known reference fingerprints of video content, such as a database of known fingerprints stored within watching station 210 or video identification system 250, in order to identify reference fingerprints potentially matching a query fingerprint. Index module 252 can be configured to query an index of quantized patch values of the known reference fingerprints.

Fingerprint match module 254 of video identification system can be configured to compare a query fingerprint to one or more known reference fingerprints, and determine that the query fingerprint matches at least one known reference fingerprint. For example, fingerprint match module 254 can determine that query fingerprint matches at least one known reference fingerprint by determining that a similarity between the query fingerprint and at least one of the known reference fingerprints satisfies a predetermined threshold. The predetermined threshold can be associated with a Tanimoto distance measurement, a Manhattan distance measurement, or other distance measurements. Additionally or alternatively, fingerprint match module 254 can use other matching techniques, such as Euclidian, Cosine, KL-Divergence, and/or Itakura matching techniques.

Identification module 256, in turn, can be configured to identify video content based on a determination that a query fingerprint(s) matches at least one reference fingerprint(s). For example, identification module 256 can identify the name or title of video content, a location within the video content currently being presented by playback device 240, and/or a channel or broadcaster providing the video content.

Figure 4:
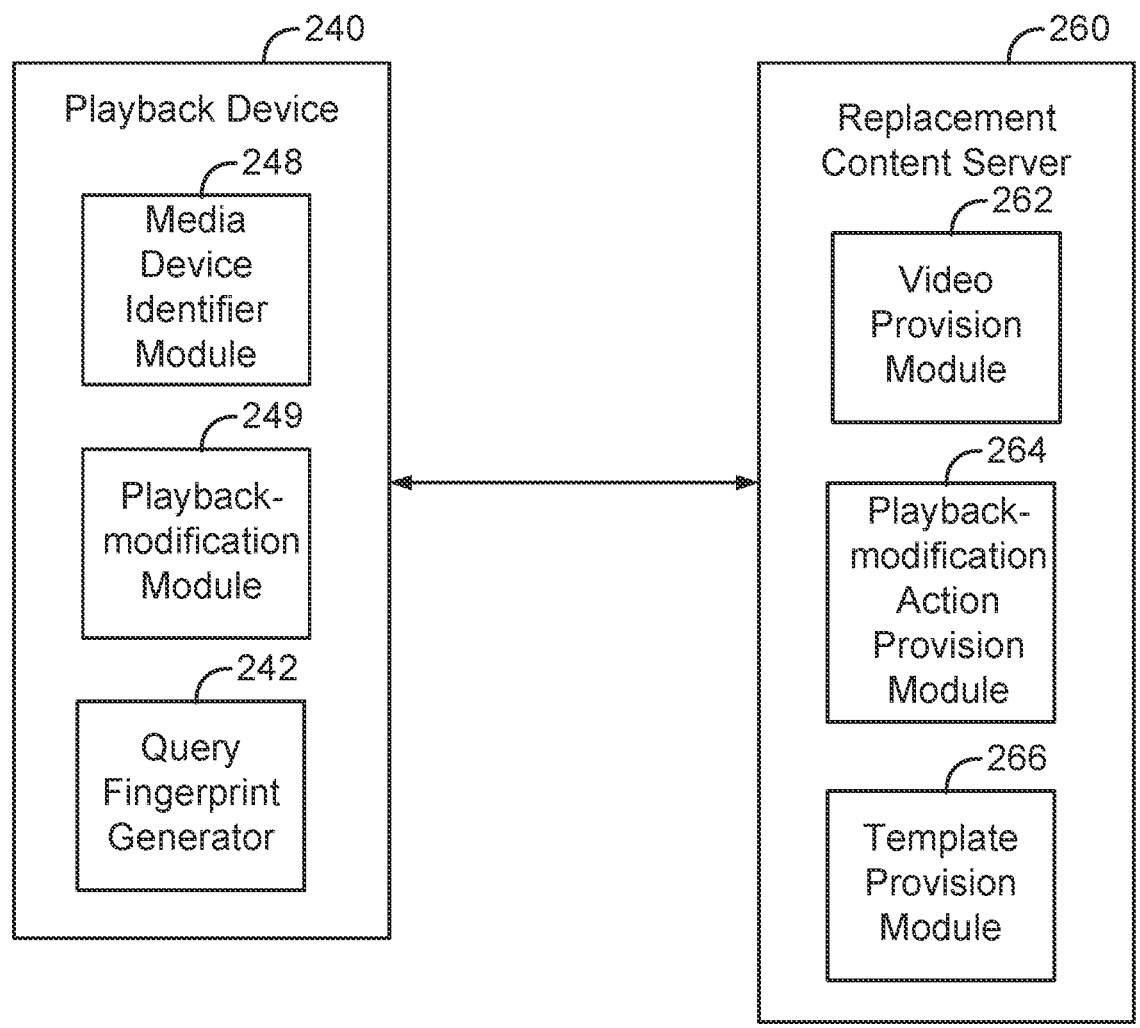
FIG. 4 is a simplified block diagram illustrating components of a playback device and a replacement content server, according to an example embodiment.

FIG. 4 is a simplified block diagram illustrating components of playback device 240 and replacement content server 260. As shown in FIG. 4, in addition to query fingerprint generator 242, playback device 240 includes a media device identifier module 248 and a playback-modification module 249. Further, replacement content server 260 includes a video provision module 262, a playback-modification action provision module 264 and a template provision module 266.

Media device identifier module 248 can identify media device 230. For example, media device identifier module 248 can identify media device 230 using a control message received from media device 230 by way of an audio and/or video interface. The control message can include content indicative of an identity of the media device, such as a type of the media device, a manufacturer of the media device, and/or a name of the media device. Media device identifier module 248 can correlate or match content of the control message(s) to one of a plurality of different media device. For instance, media device identifier module 248 can store correlation data mapping (i) control messages or content of control messages to (ii) media devices. Playback-modification module 249 can use the correlation data to map a received control message to a media device. Alternatively, media device identifier module 248 can send content of the control message(s) to a server (such as replacement content server 260), the server can correlate or match the content of the control message(s) to one of a plurality of different media devices, and the server can send an identity of the media device to media device identifier module 248.

One example of an audio and/or video interface is a High-Definition Multimedia Interface (HDMI) interface. With an HDMI interface, the control message can include a Consumer Electronics Control (CEC) message. CEC is an HDMI feature that allows a single remote control to control different CEC-enabled devices that are connected through HDMI interfaces, and allows individual CEC-enabled devices to command and control each other. For instance, CEC allows a single user input provided on an optical disc player to cause a playback device to power on and configure the playback device to receive media content from the optical disc player.

Media device identifier module 248 and/or a server can analyze content of one or more CEC messages to infer an identity of media device 230. One example of such content is a logical address. CEC enabled-devices have logical addresses that reflect their device types. Specifically, each CEC enabled-device connected to a playback device can have one of fifteen logical addresses (addresses 1-15), with each logical address being indicative of a respective type of the media device. When a CEC enabled-device connects to a playback device, the CEC-enabled device broadcasts one or more CEC messages including the logical address. Hence, when media device 230 connects to playback device 240, media device 230 can broadcast its logical address to playback device 240. Playback device 240 can store a record of the logical address for the media device 230, for use in commanding and controlling media device 230. Media device identifier module 248 can access the stored record to determine the logical address for media device 230.

Another example of content of a CEC message is a device vendor ID. A device vendor ID of a CEC-enabled device is a code that corresponds to a manufacturer of the CEC-enabled device. Media device identifier module 248 can determine a device vendor ID of the media device by sending a request to media device 230, and media device 230 can respond with a message that includes the device vendor ID of media device 230. Alternatively, when media device 230 connects to playback device 240 (or at another time), media device 230 can send its device vendor ID to playback device 240, and playback device 240 can store the device vendor ID in a database. Media device identifier module 248 can therefore determine the device vendor ID by retrieving the device vendor ID from the database.

Still another example of content of a CEC message is an on-screen display name. Each CEC-enabled device can have an on-screen display name that other CEC-enabled devices can display to viewers. Media device identifier module 248 can determine an on-screen display name of media device 230 by sending a request to media device 230, and media device 230 can respond with a message that includes the on-screen display name of media device 230. Alternatively, when media device 230 connects to playback device 240 (or at another time), media device 230 can send its on-screen display name to the playback device, and playback device 240 can store the on-screen display name in a database. Media device identifier module 248 can therefore determine the on-screen display name by retrieving the on-screen display name from the database. In some examples, media device identifier module 248 can determine the identity of media device 230 using both the device vendor ID and the on-screen display name of media device 230.

Additionally or alternatively, media device identifier module 248 can identify media device 230 using fingerprinting. For instance, query fingerprint generator 242 can generate a fingerprint from a portion of media content received from media device 230, and provide the fingerprint to media device identifier module 248. The fingerprint can be generated at a time when playback device 240 displays an overlay, such as an electronic program guide or display information provided to playback device 240 by media device 230. Media device identifier module 248 can send the fingerprint to a server, such as video identification system 250, and then the server can respond to media device identifier module 248 with an indication of the identity of media device 230. In some cases, media device identifier module 248 can send the fingerprint to the server together with content of one or more control messages, and the server could analyze the content of the one or more control messages and the fingerprint together to infer the identity of media device 230.

Video provision module 262 can provide replacement media content to playback device 240. For instance, video identification system 250 can identify video content that playback device 240 is providing for display and, based on the identified video content, video provision module 262 can provide replacement media content corresponding to the video content to playback device 240.

Playback device 240 can receive the replacement media content by way of a network communication interface. For instance, the replacement media content can be streamed to playback device 240 over the Internet and then stored in a local cache of playback device 240. When playback device 240 receives a trigger to insert the replacement media content into a sequence of media content, playback device 240 can retrieve the replacement media content from the local cache, and provide the replacement media content for display using a media player that is configured to display media files.

In some instances, providing the replacement media content for display can involve switching from providing media content that is received from media device 230 to providing replacement media content that is stored in a database of playback device 240. Playback device 240 can include a system on a chip that includes a frame buffer. In order to provide the replacement media content for display, the media player of playback device 240 can insert the replacement media content into the frame buffer. Prior to inserting the replacement media content into the frame buffer, the system on a chip may have inserted media content that is received from media device 230 into the frame buffer.

The replacement media content can include a targeted advertisement that is to be substituted for a generic advertisement. For instance, the targeted advertisement can be a local advertisement, and the generic advertisement can be a national advertisement. As another example, the targeted advertisement can be an advertisement that is selected based on a demographic of a user of playback device 240.

Playback-modification module 249 can be configured to carry out various acts to modify playback of replacement media content. By way of example, while playback device 240 is displaying replacement media content using a media player, playback-modification module 249 can determine that a remote control transmitted an instruction to a media device, determine a playback-modification action corresponding to the instruction and media device 230, and modify playback of the replacement media content in accordance with the playback-modification action.

Playback device 240 can include an infrared receiver. Accordingly, the act of determining that a remote control transmitted an instruction to media device 230 can involve playback device 240: receiving, via the infrared receiver of playback device 240, the instruction; matching a characteristic of the received instruction with a characteristic of a reference instruction; and based on the matching, determining that the remote control transmitted an instruction to media device 230. In other examples, playback device 240 can perform similar acts to those described above in connection with an infrared-based interface, but in connection with another type of interface, such as a RF-based interface.

Additionally or alternatively, a remote control could wirelessly transmit instructions to media device 230 in accordance with a wireless communication protocol, such as Bluetooth or WiFi. To detect instructions transmitted by a remote control in accordance with a wireless communication protocol, playback device 240 can be equipped with a decoder, such as a Bluetooth, WiFi, or RF decoder, and playback device 240 can detect the instruction by monitoring wireless communication traffic using the decoder.

Further, playback device 240 can use control messages communicated between playback device 240 and media device 230 over an audio and/or video interface to help detect that a remote control transmitted an instruction to media device 230. The audio and/or video interface could be an HDMI interface, and content of a control message communicated between playback device 240 and media device 230 over the HDMI interface could include an instruction transmitted by the remote control, with the instruction being an instruction for controlling operation of media device 230. For instance, a remote control of playback device 240 could transmit to playback device 240 an instruction for controlling media device 230, and playback device 240 could then forward the instruction to media device 230 over the HDMI interface. Hence, control messages communicated over an HDMI interface between playback device 240 and media device 230 are also a potential source of information that playback device 240 can use to determine that a remote control transmitted an instruction to media device 230, regardless of the manner in which the remote control transmitted the instruction. Playback-modification module 249 can select a playback-modification corresponding to the instruction from among a set of playback-modification actions corresponding to media device 230. Playback-modification module can store correlation data mapping (i) instructions provided to a media device to (ii) playback-modification actions. Playback-modification module 249 can use the correlation data to map a detected instruction intended for media device 230 to a playback-modification action.

In practice, different media devices, such as different media devices manufactured by different manufacturers, can be configured to receive different instructions and/or to respond to those instructions in different manners. Playback-modification action provision module 264 can store correlation data for different respective media devices. Upon request, or at another time, playback-modification action provision module 264 can provide correlation data corresponding to an identified media device to playback modification module 249.

The playback-modification action can take various forms depending on the instruction that is transmitted to media device 230. As one example, the instruction to media device 230 can be an instruction configured to cause performance of a channel-change operation, and the playback-modification action can include causing the display of the replacement media content to cease. For instance, while playback device 240 is presenting the replacement media content, a user can provide an instruction indicative of a selection of a new channel. Playback-modification module 249 can respond to this instruction by switching from providing the replacement media content for display to providing media content that is received from media device 230.

To smooth the transition from providing replacement media content for display using the media player to providing media content that is received from media device 230, playback-modification module can cause the replacement media content to fade to black over a period of time (e.g., one half of a second), and then cause the media content that is received from media device 230 to fade in from black over a period of time (e.g., one half of a second). In this manner, when a user changes a channel while playback device 240 is providing replacement media content for display, playback device 240 can cause display of the replacement media content to cease, and transition to providing for display other media content that is received from the media (i.e. media content corresponding to the selected channel).

As another example, the instruction to media device 230 can be a playback-speed adjustment (e.g., an instruction to pause, rewind, or fast-forward the replacement media content), and the playback-modification action can include adjusting a playback speed at which the replacement media content is provided.

In some examples, the instruction to media device 230 can be an instruction that causes media device 230 to provide an overlay for display. For instance, instruction could be a volume adjustment (e.g., an instruction to increase or decrease a volume of playback device 240), and the overlay could be a volume-adjustment graphic. Alternatively, the instruction could be a playback-speed adjustment (e.g., an instruction to pause, rewind, or fast-forward the replacement media content), and the overlay could be a playback-speed graphic. Further, the instruction could be a request to access a channel-selection guide, and the overlay could be a channel-selection guide. Similarly, the instruction could also be an instruction to access a menu or display information (e.g., time, date, channel identifier, content identifier, etc.), and the overlay could be a menu graphic or a display-information graphic.

Playback-modification module 249 can store correlation data mapping instructions to overlays. The correlation data (or other data stored by playback device 240) can also indicate respective regions within a display of playback device 240 at which media device 230 is configured to provide the overlays.

Upon determining that a remote control transmitted an instruction configured to cause media device 230 to provide an overlay for display, playback-modification module 249 can use the correlation data to map the instruction to an overlay. Playback-modification module 249 can also use the correlation data to determine a region within a display of playback device 240 at which media device 230 is configured to provide the overlay for display.

In practice, different playback devices, such as different playback devices manufactured by different manufacturers, can be configured to provide different overlays. Similarly, different models of playback devices made by a single manufacturer can be configured to provide different overlays. Template provision module 266 can store correlation data for different respective media devices. Upon request, or at another time, template provision module 266 can provide correlation data corresponding to an identified media device to playback device 240. For instance, playback-modification module 249 can send a request to template provision module 266, with the request including an identifier of a media device, and template provision module 266 can respond to the request by providing the correlation data to playback-modification module 249.

After determining a region corresponding to an overlay, playback-modification module 249 can modify a transparency of the region. Playback-modification module 249 can modify the transparency of the region by applying an opacity mask to the region. The opacity mask can include data indicative of portions of the display of playback device 240 for which the transparency of replacement media content presented by the media player should be modified. For instance, the opacity mask can include a 1-bit transparency mask that indicates, on a pixel-by-pixel basis, whether the pixel should be transparent or opaque.

When playback device 240 provides the replacement media content for display using a media player, the media player can present the replacement media content in a media-player layer that is on top of another layer in which other media content is provided for display, such as media content received from a media device. Applying the opacity mask to the region within the display can allow content that is within the same region, but provided in a layer that is beneath the replacement media content, to become visible. In other words, applying the opacity mask to the region can allow graphics that playback device 240 provides for display to become visible. Hence, if (i) playback device 240 provides an overlay, such as a volume-adjustment graphic, menu, or playback-speed graphic, and (ii) playback-modification module 248 applies an opacity mask to a region in which playback device 240 provides the overlay, the overlay may be visible on the display of the playback device through the replacement media content. Advantageously, applying the opacity mask to a region within the display, rather than to the entire display, allows a first region of the replacement media to be displayed over and obscure the other media content while, at the same time, allowing a graphic corresponding to the instruction to be visible through a second region of the replacement media content.

Further, the instruction to media device 230 could also be an instruction to access a menu (e.g., a channel-selection guide), and the playback-modification action can include providing the menu within a first region of a display of playback device 240 and providing the replacement media content within a second region of the display. With this type of instruction, playback-modification module 249 can determine the first region and the second region by determining a template corresponding to the instruction. The template can specify the first region and the second region. For instance, the template can identify the boundary pixels (e.g., corner pixels) of the first region and the second region.

In some instances, playback-modification module 249 can also reduce a size of the replacement media content based on a size of the second region. Reducing the size of the replacement media content can allow playback device 240 to display the replacement media content as a picture-in-picture display within the menu.

III. Example Operations

Figure 5:
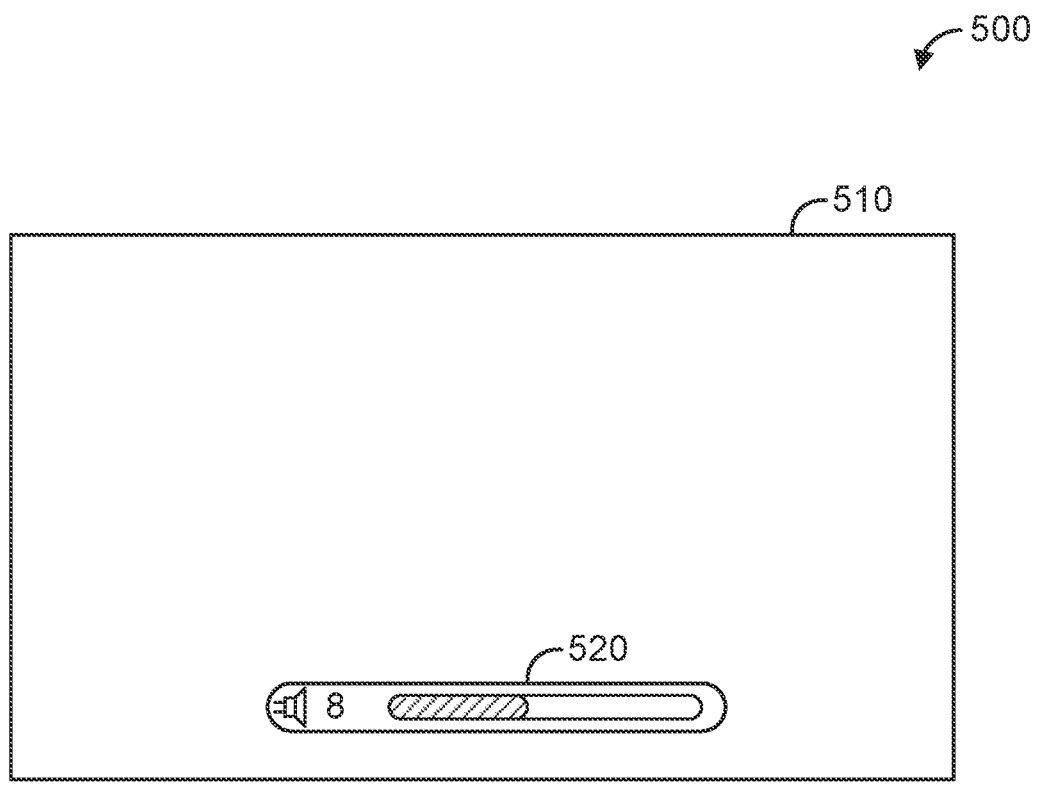
FIG. 5 is a display diagram illustrating a playback-modification action, according to an example embodiment.

FIG. 5 is a display diagram 500 illustrating a playback-modification action. As shown in FIG. 5, display diagram 500 includes a first display region 510 and a second display region 520. While playback device 240 provides replacement media content for display within first display region 510, playback device 240 can detect a volume-adjustment instruction transmitted to media device 230. Based on detecting the instruction, playback-modification module 249 can apply an opacity mask to second display region 520. Applying the opacity mask to second display region 520 allows a volume-adjustment graphic provided in a layer beneath a media-player layer to become visible through the media-player layer. Accordingly, when media device 230 provides the volume-adjustment graphic to playback device 240 for display, the volume-adjustment graphic is visible within second display region 520, mimicking the manner in which the volume-adjustment graphic would appear if playback device 240 was instead presenting media content that is received from media device 230.

Figure 6:
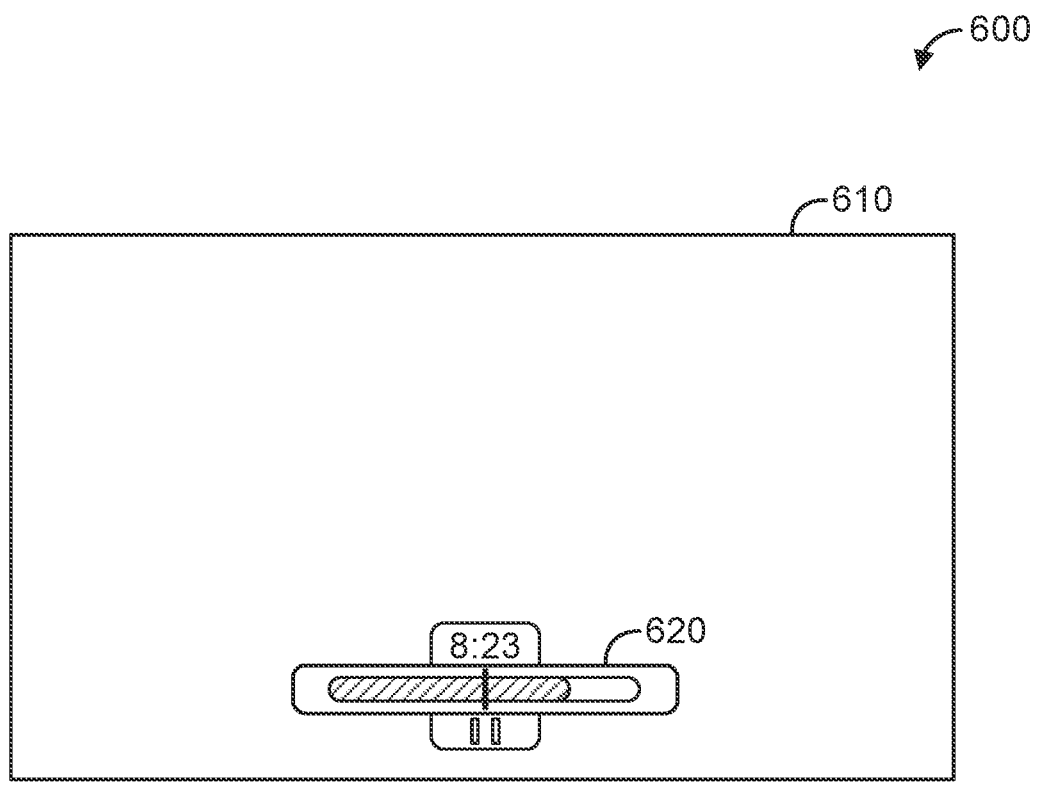
FIG. 6 is another display diagram illustrating a playback-modification action, according to an example embodiment.

FIG. 6 is another display diagram 600 illustrating a playback-modification action. As shown in FIG. 6, display diagram 600 includes a first display region 610 and a second display region 620. While playback device 240 provides replacement media content for display within first display region 610, playback device 240 can detect a play-back speed adjustment instruction transmitted to media device 230. Based on detecting the instruction, playback-modification module 249 can apply an opacity mask to second display region 620. Applying the opacity mask to second display region 620 allows a playback-speed graphic provided in a layer beneath a media-player layer to become visible through the media-player layer. Accordingly, when media device 230 provides the playback-speed graphic to playback device 240 for display, the playback-speed graphic is visible within second display region 620, mimicking the manner in which the playback-speed graphic would appear if playback device 240 was instead presenting media content that is received from media device 230.

Figure 7:
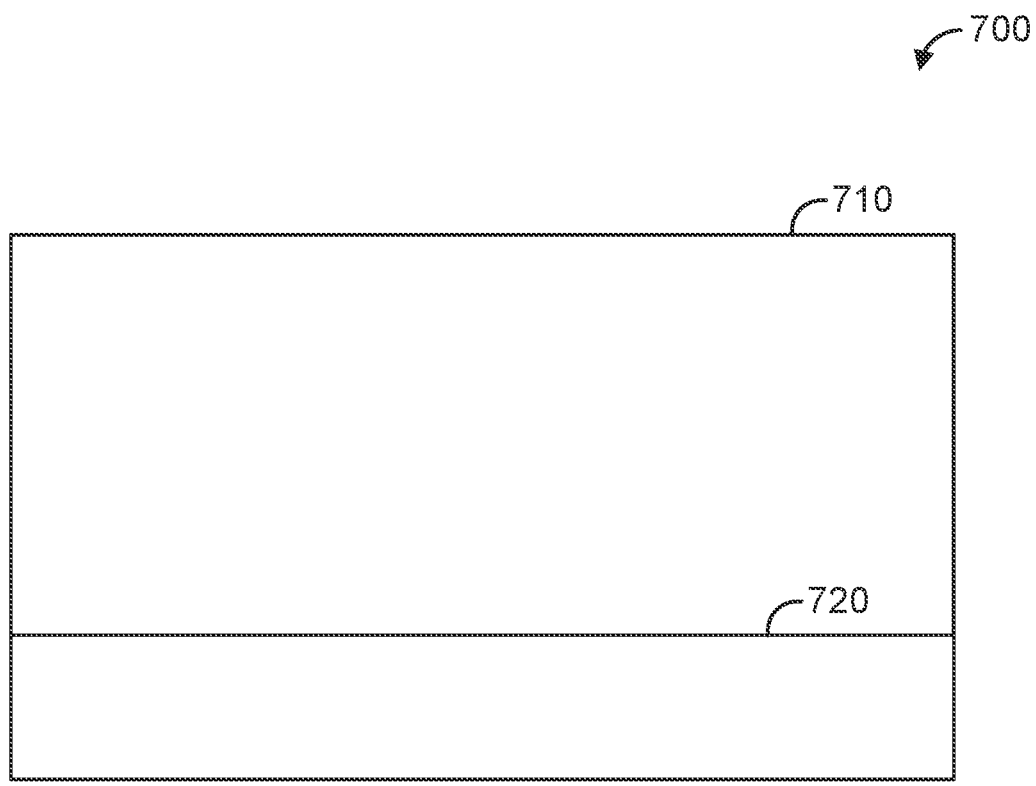
FIG. 7 is still another display diagram illustrating a playback-modification action, according to an example embodiment.

FIG. 7 is still another display diagram 700 illustrating a playback-modification action. As shown in FIG. 7, display diagram 700 includes a first display region 710 and a second display region 720. While playback device 240 provides replacement media content for display within first display region 710, playback device 240 can detect an instruction for accessing a channel-selection guide that is transmitted to media device 230. Based on detecting the instruction, playback-modification module 249 can apply an opacity mask to second display region 720. Applying the opacity mask to second display region 720 allows the channel-selection guide provided in a layer beneath a media-player layer to become visible through the media-player layer. Accordingly, when media device 230 provides the channel-selection guide to playback device 240 for display, the channel-selection guide is visible within second display region 720, mimicking the manner in which the channel-selection guide would appear if playback device 240 was instead presenting media content that is received from media device 230.

Figure 8:
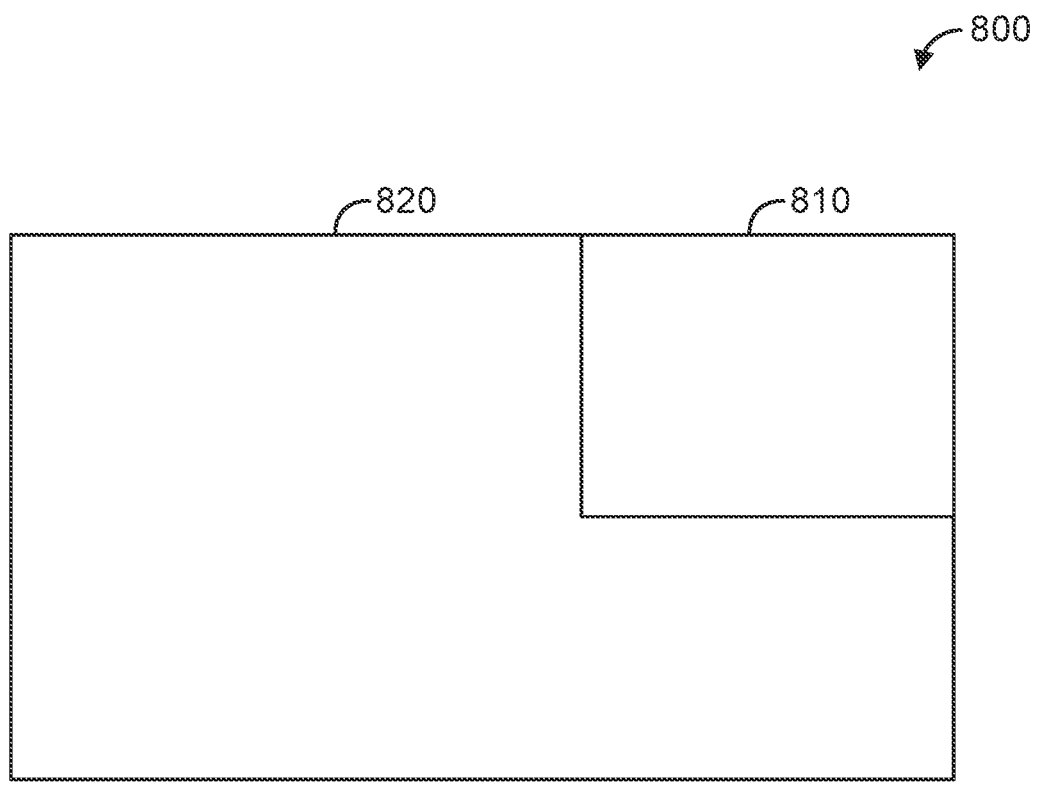
FIG. 8 is still another display diagram illustrating a playback-modification action, according to an example embodiment.

FIG. 8 is still another display diagram 800 illustrating a playback-modification action. As shown in FIG. 8, display diagram 700 includes a first display region 810 and a second display region 820. While playback device 240 provides replacement media content for display, playback device 240 can detect an instruction for accessing a menu that is transmitted to media device 230. Based on detecting the instruction, playback-modification module 249 can reduce a size of the replacement media content and provide the replacement media content for display within first display region 810. Accordingly, when media device 230 provides the menu to playback device 240 for display, the menu is visible within second display region 820, mimicking the manner in which the menu would appear if playback device 240 was instead presenting media content that is received from media device 230.

Figure 9:
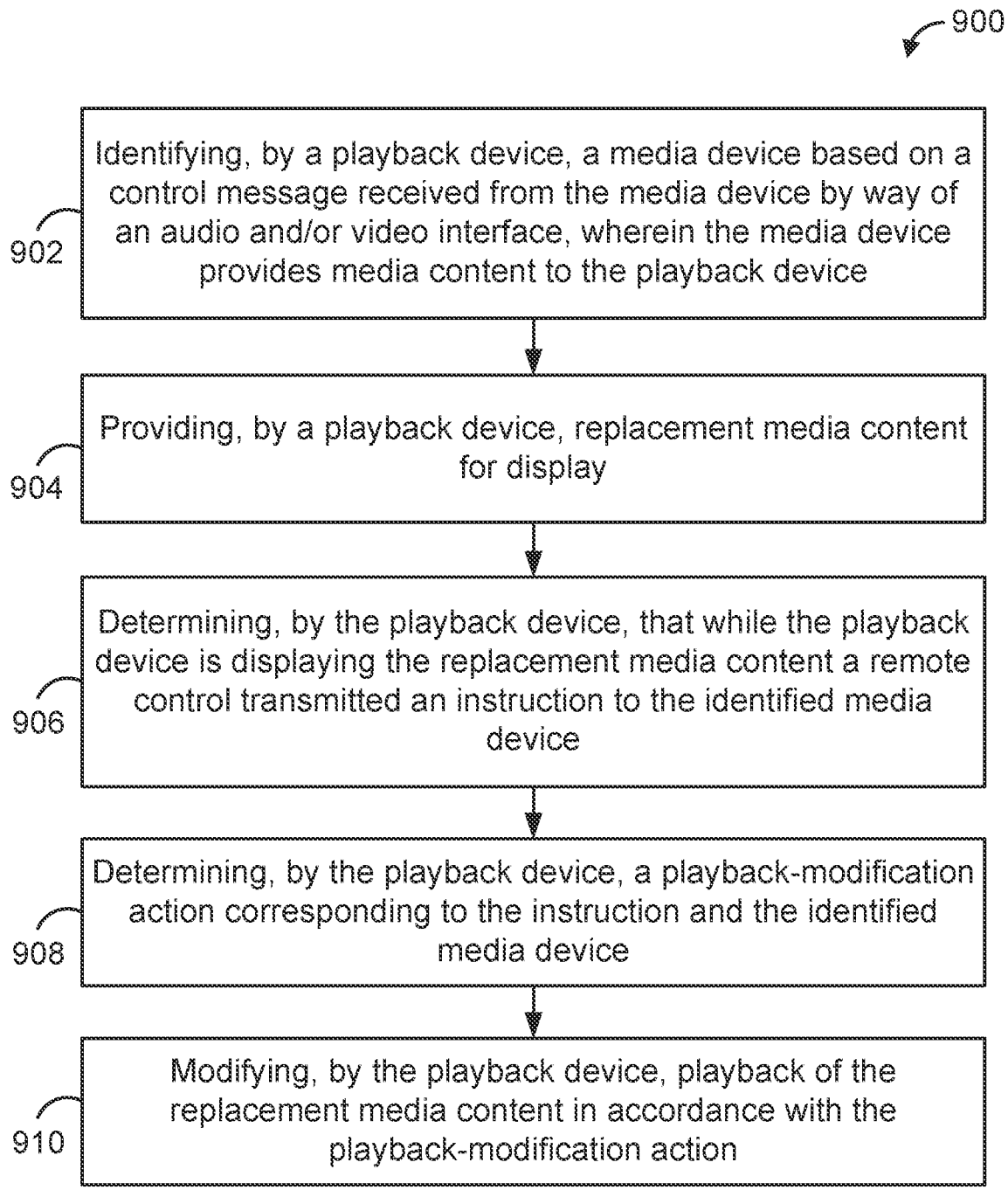
FIG. 9 is a flow chart of an example method.

FIG. 9 is a flow chart of an example method 900. Method 900 can be carried out by a playback device, such as playback device 240 or more generally, by a computing system. At block 902, method 900 includes identifying, by a playback device, a media device based on a control message received from the media device by way of an audio and/or video interface, where the media device provides media content to the playback device. At block 904, method 900 includes providing, by the playback device, replacement media content for display. At block 906, method 900 includes determining, by the playback device, that while the playback device is displaying the replacement media content a remote control transmitted an instruction to the identified media device. At block 908, method 900 includes determining, by the playback device, a playback-modification action corresponding to the instruction and the identified media device. And at block 910, method 900 includes modifying, by the playback device, playback of the replacement media content in accordance with the playback-modification action.

Figure 10:
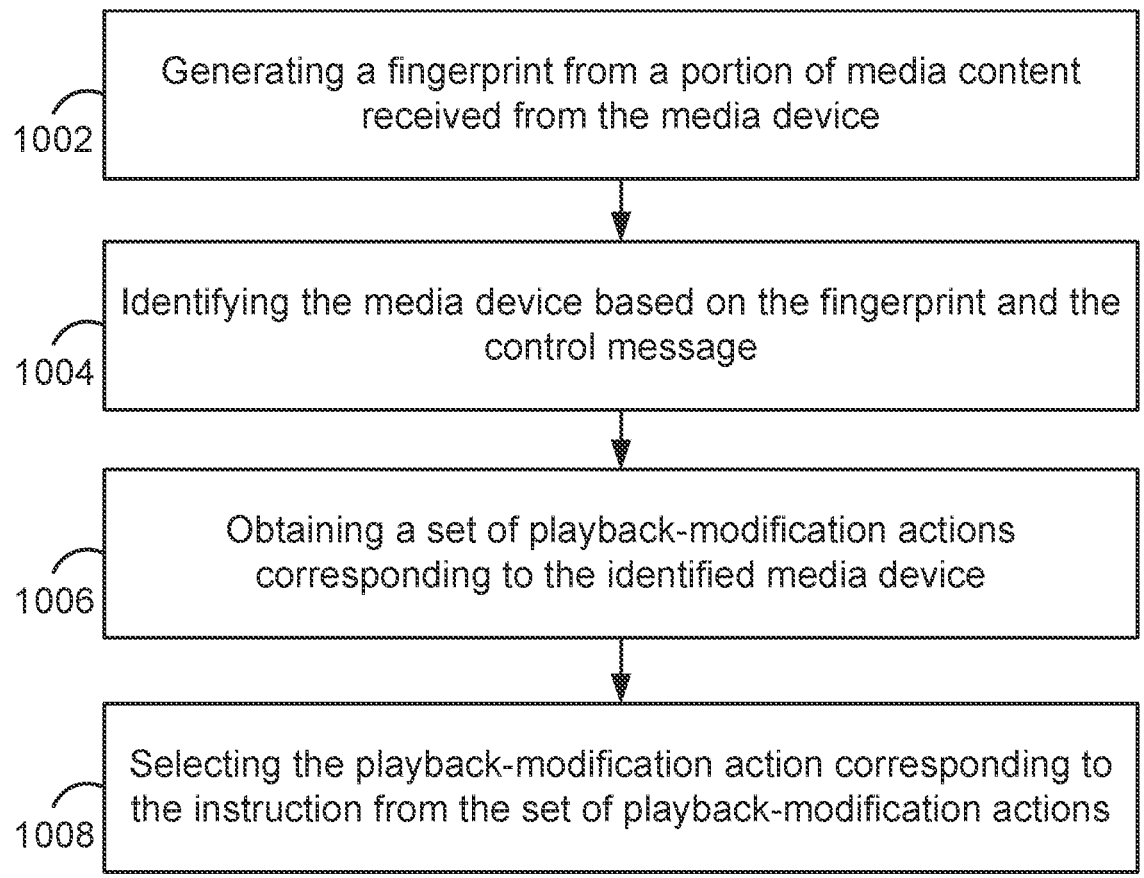
FIG. 10 is a flow chart illustrating additional acts that can be carried out in conjunction with the method shown in FIG. 9.

FIG. 10 is a flow chart illustrating additional acts that can be carried out in conjunction with the method shown in FIG. 9. Blocks 1002 and 1004 can be carried out as part of block 902 of FIG. 9, for example. Further, blocks 1006 and 1008 can be carried out as part of block 908 of FIG. 9. Block 1002 involves generating a fingerprint from a portion of media content received from the media device. Block 1004 involves identifying the media device based on the fingerprint and the control message. Block 1006 involves obtaining a set of playback-modification actions corresponding to the identified media device. Block 1108 involves selecting the playback-modification action corresponding to the instruction from the set of playback-modification actions.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   identifying, by a playback device, a media device based on a control message received from the media device by way of an audio and/or video interface, wherein the media device provides media content to the playback device;
   while the playback device is displaying replacement media content, receiving, using a receiver of the playback device, an instruction that a remote control of the media device transmitted to the identified media device;

determining, by the playback device, a playback-modification action corresponding to the instruction and the identified media device, wherein determining the playback-modification action corresponding to the instruction and the media device comprises selecting the playback-modification action corresponding to the instruction from among a set of playback-modification actions corresponding to the identified media device; and modifying, by the playback device, playback of the replacement media content in accordance with the playback-modification action.

2. The method of claim 1, further comprising obtaining the set of playback-modification actions corresponding to the identified media device.

3. The method of claim 1, further comprising:

generating, by the playback device, a fingerprint from a portion of media content received from the media device, wherein the identifying is further based on the fingerprint.

4. The method of claim 1, wherein the audio and/or video interface comprises a High-Definition Multimedia Interface (HDMI) interface, and wherein the control message comprises a Consumer Electronics Control (CEC) message.

5. The method of claim 4:

wherein the CEC message includes a logical address of the media device, the logical address being indicative of a device type of the media device, and wherein identifying the media device comprises identifying the media device based at least on the logical address of the media device.

6. The method of claim 4:

wherein the CEC message includes a device vendor identifier (ID) of the media device, the device vendor ID being indicative of a manufacturer of the media device, and wherein identifying the media device comprises identifying the media device based at least on to device vendor ID of the media device.

7. The method of claim 4:

wherein the CEC message includes an on-screen display name of the media device, and wherein identifying the media device comprises identifying the media device based at least on the on-screen display name of the media device.

8. The method of claim 1, wherein the instruction comprises an instruction configured to cause performance of a channel-change operation, and wherein the playback-modification action comprises causing the display of the replacement media content to cease.

9. The method of claim 1:

wherein determining the playback-modification action comprises (i) determining an overlay corresponding to the instruction and the identified media device and (ii) determining a region within a display of the playback device corresponding to the overlay, and wherein modifying playback of the replacement media content comprises modifying a transparency of the region such that the overlay is visible through the replacement media content when the identified media device provides the overlay for display.

10. The method of claim 9, wherein modifying the transparency of the region comprises applying an opacity mask to the region.

11. The method of claim 1, wherein the instruction comprises an instruction to access a menu, and wherein the playback-modification action comprises providing the menu within a first region of a display of the playback device and providing the replacement media content within a second region of the display.

12. The method of claim 11, further comprising determining a template corresponding to the instruction and the identified media device, wherein the template specifies the first region and the second region.

13. The method of claim 12, further comprising reducing a size of the replacement media content based on a size of the second region.

14. The method of claim 1, wherein the instruction comprises a playback-speed adjustment, and wherein modifying playback of the replacement media content comprises adjusting a playback speed at which the replacement media content is provided.

15. The method of claim 1, wherein the playback device comprises a television, and wherein providing the replacement media content for display comprises providing the replacement media content for display using a media player.

16. The method of claim 15, wherein the replacement media content is an advertisement.

17. The method of claim 1, wherein receiving, using the receiver of the playback device, the instruction comprises:

receiving, via a wireless communication interface of the playback device, the instruction; and matching a characteristic of the instruction with a characteristic of a reference instruction.

18. A non-transitory computer-readable medium having stored thereon program instructions that upon execution by at least one processor, cause the at least one processor to perform operations comprising:

identifying a media device based on a control message received from the media device by way of an audio and/or video interface, wherein the media device provides media content to a playback device;

while the playback device is displaying replacement media content, receiving, using a receiver of the playback device, an instruction that a remote control of the media device transmitted to the identified media device;

determining a playback-modification action corresponding to the instruction and the identified media device, wherein determining the playback-modification action corresponding to the instruction and the media device comprises selecting the playback-modification action corresponding to the instruction from among a set of playback-modification actions corresponding to the identified media device; and modifying playback of the replacement media content in accordance with the playback-modification action.

19. The non-transitory computer-readable medium of claim 18, wherein the audio and/or video interface comprises a High-Definition Multimedia Interface (HDMI) interface, and wherein the control message comprises a Consumer Electronics Control (CEC) message.

20. A computing system comprising:

one or more processors; and a non-transitory computer-readable medium having stored therein instructions that are executable to cause the computing system to perform operations comprising:

identifying a media device based on a control message received from the media device by way of an audio and/or video interface, wherein the media device provides media content to a playback device, while the playback device is displaying replacement media content, receiving, using a receiver of the playback device, an instruction that a remote control of the media device transmitted to the identified media device, determining a playback-modification action corresponding to the instruction and the identified media device, wherein determining the playback-modification action corresponding to the instruction and the media device comprises selecting the playback-modification action corresponding to the instruction from among a set of playback-modification actions corresponding to the identified media device, and modifying playback of the replacement media content in accordance with the playback-modification action.

* * * * *